June 17, 1941.    R. I. STRONGIN    2,246,420
MACHINE FOR MAKING CANDY CANES
Filed Nov. 12, 1940    3 Sheets-Sheet 1

ROBERT I. STRONGIN
INVENTOR
PER
ATTORNEY

June 17, 1941.   R. I. STRONGIN   2,246,420
MACHINE FOR MAKING CANDY CANES
Filed Nov. 12, 1940   3 Sheets-Sheet 2

ROBERT I. STRONGIN
INVENTOR
PER

ATTORNEY

June 17, 1941.　　　R. I. STRONGIN　　　2,246,420
MACHINE FOR MAKING CANDY CANES
Filed Nov. 12, 1940　　　3 Sheets-Sheet 3

ROBERT I. STRONGIN
INVENTOR
PER

ATTORNEY

Patented June 17, 1941

2,246,420

UNITED STATES PATENT OFFICE 2,246,420

MACHINE FOR MAKING CANDY CANES

Robert I. Strongin, Chicago, Ill.

Application November 12, 1940, Serial No. 365,193

20 Claims. (Cl. 107—4)

This invention relates to an improved machine for making candy canes and has, for one of its principal objects, the provision of mechanical means for producing the rather well-known confection which comprises a stick of candy having one end bent to simulate the handle of a cane.

Heretofore, these candy canes were made by hand, the shape being such as to preclude formation by any ordinary or known mechanism.

One of the important objects of this invention is to provide a machine which will produce, in a satisfactory and economical manner, the confections known as candy canes and which will, furthermore, accomplish such production with a minimum of manual operations while, at the same time, producing a satisfactory and commercially salable product.

Among the objects of the invention is included the provision of a machine which will receive the heated and elongated sticks of candy material from which the canes are produced and which will first cut the same into uniform lengths and then produce the desired bend and finally eject the completed canes onto a belt or other conveyor whereby they are delivered for packing and shipping.

Another object of the invention is the provision of a candy cane making machine which shall be readily adaptable for the production of various sizes of canes with but slight and simple changes in the mechanism.

Other and further important objects of the invention will be apparent from the disclosures in the accompanying drawings and following specification.

The invention, in a preferred form, is illustrated in the drawings and hereinafter more fully described.

Figure 1:
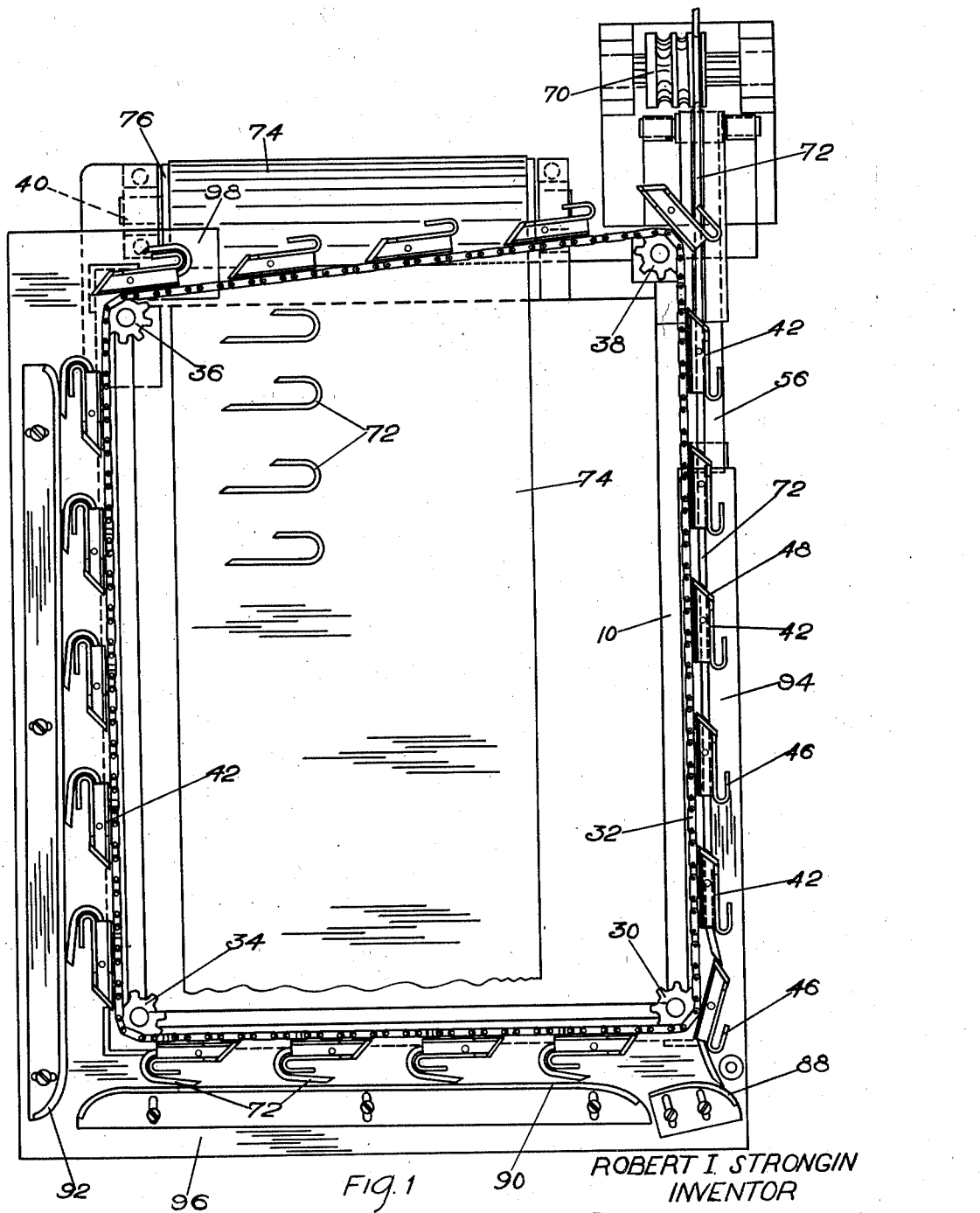
Figure 1 is a top plan view of the improved candy cane making machine of this invention and shows the progress of the candy from the time that it is fed into the feed rollers in the shape of a stick until it is ejected from the machine in the shape of candy canes.

The reference numeral 10 indicates generally the supporting frame of the improved candy cane making machine of this invention, the same having legs 12 and a motor or other source of power 14 from which belts or chains 16, 18 and 20 are driven.

The belt 16 (Figure 2) by means of a pulley 22 operates a shaft 24 and beveled gear 26 which, in turn, drives a shaft 28 extending vertically of the machine and at the upper end of which is fixed a sprocket 30 (Figure 1).

Figure 3:
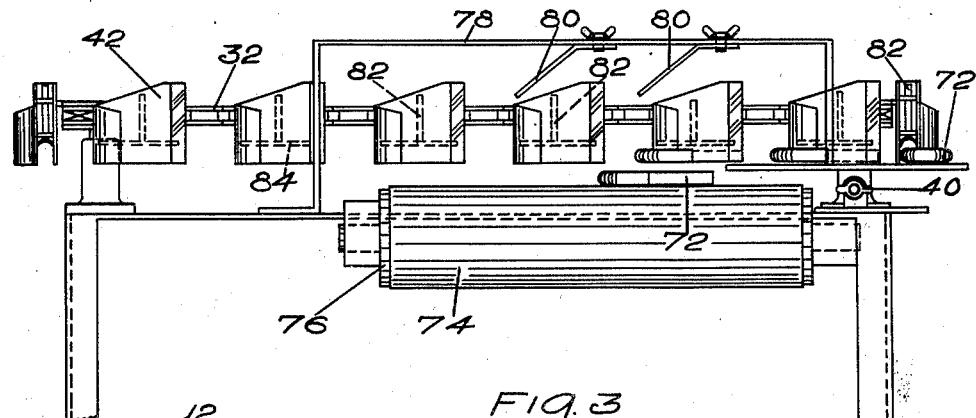
Figure 3 is an end view of the structure taken from the right of Figure 2.

A chain, belt or the like 32 is mounted on the sprocket 30 and extends around the top edges of the machine, riding at each corner upon other sprockets 34, 36 and 38. The sprocket 36 is mounted on a stub shaft which can be moved longitudinally of the machine by means of an adjusting device 40 (Figures 1 and 3). This allows for take-up of any slack in the chain 32 and also allows for the use of chains of slightly different lengths in the machine, which chains can be fitted with cane cutting and shaping dies of different sizes, depending upon the particular size of cane which the operator desires to produce at the moment.

Figures 4, 5:
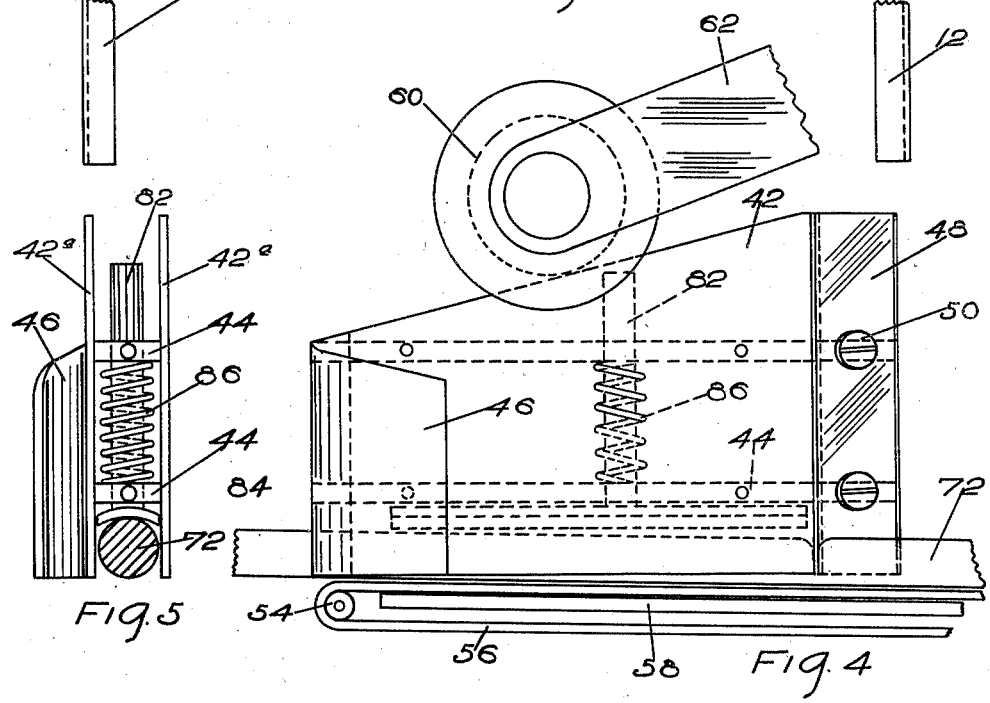
Figure 4 is an enlarged detail view of one of the cutting and shaping dies for the candy cane making machine of this invention, showing the same in actual operation.
Figure 5 is an end view of the cutting die shown in Figure 4 but with the cutting knife removed for purposes of clarity and with the contained portion of the candy stick shown in section.
Figure 6:
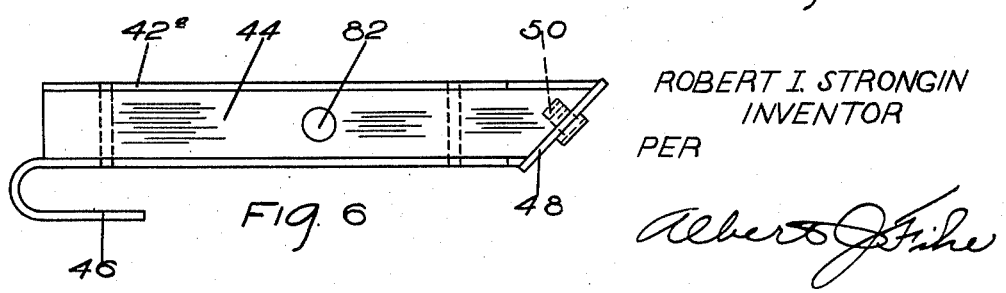
Figure 6 is a top plan view of the cutting die of Figures 4 and 5.

Mounted upon the chain 32 at regular spaced intervals is a series of cutting and shaping dies 42, one of these dies being shown in detail in Figures 4, 5 and 6. Each die comprises two spaced side plates 42a, cross supports 44 therebetween, and at the forward left edge of each die is provided a shaping plate 46 of the necessary curvature and dimensions so as to produce the desired crook or bend in the candy stick.

At the rear of each die is removably positioned a cutting blade 48 which, as best shown in Figure 6, is mounted at an angle, preferably a 45° angle and is held in position by means of a pair of cap screws or the like 50 which are fitted into the web members 44.

Figure 2:
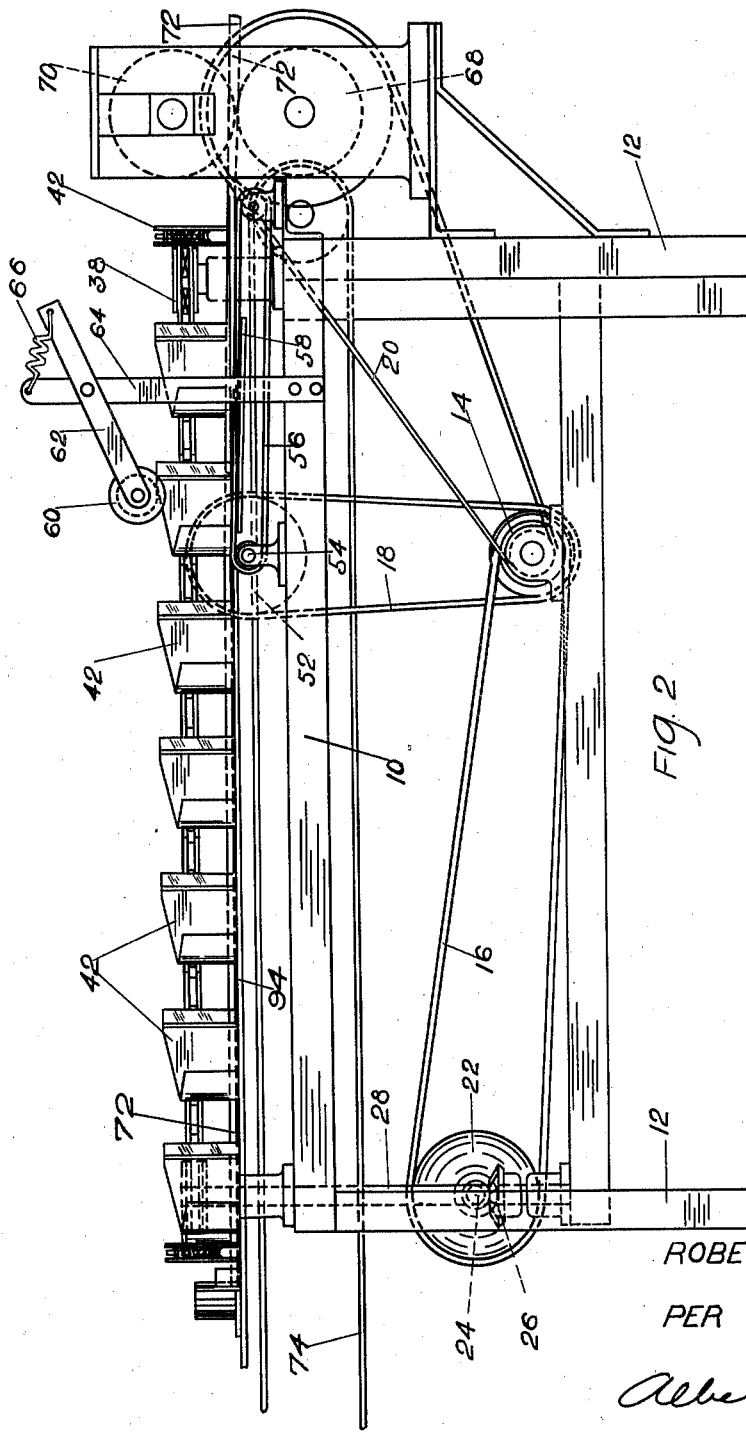
Figure 2 is a side elevation of the device of this invention, also showing certain portions which, for the purpose of clarity, were omitted from the showing of Figure 1.

As best shown in Figure 2, the belt 18 rotates a pulley 52 fixed on a shaft 54 which, in turn, drives a belt 56 (Figures 2 and 4). This belt is preferably of leather or some similar material and its uppermost part travels over a cutting table 58 which coincides with the initial path of travel of the dies 42 after they have rounded the sprocket wheel 38. An impeller wheel 60 is mounted on a cross arm 62 which is pivoted on an upright 64 fixed to the frame of the machine. A spring 66 connects the ends of the bar 62 and the upright 64 and normally urges the impeller wheel or roller 60 into a downward position, and this wheel is positioned so as to ride over the top faces of the cutting and shaping dies 42 just at the point at which the dies are traveling over the cutting table 58 and the traveling belt 56. The top or forwardly moving portion of the belt 56 travels at the same rate of speed as the chain which carries the cutting and shaping dies 42.

The belt 20 operates a pair of feed rollers 68 and 70, which rollers are provided with matched grooves of different sizes as best shown in Figure 1. These grooves are for the purpose of receiving preliminarily shaped sticks or rods of candy 72 depending upon the particular size of canes which the operator desires to produce.

A delivery conveyor belt 74 extends longitudinally of the machine and slightly to one side thereof. This can be driven by the power means 14 or by an extraneous power.

The rear end of this delivery belt is mounted upon a roller 76 which roller is slightly beyond the rear end of the machine as best shown in Figures 1 and 3.

A framework 78 is mounted on the rear end of the machine and is provided with one or more ejector cams 80 which are adjustably mounted thereon and of a width to fit between the plates 42a of the dies 42 as they pass beneath the frame 78. The cams 80 are of a sufficient length to contact the top ends of pins 82 which are slidably mounted in the webs 44 between the plates 42a of the shaping and cutting dies 42, and at the bottom of each of these pins is fixed an ejector plate 84. The pins and plates are normally held in uppermost position by means of helical springs 86.

In operation, the stick of candy in a warm or plastic condition while being spun is fed into the grooves in the feed rollers 68 and 70, and from thence, into the lowermost portion of the die and shaping elements 42 as they travel around the upper edge of the framework.

As best shown in Figure 4, the stick of newly spun candy 72 coming into the machine from the feed rollers 70 (Figures 1 and 2) rides upon a belt 56, and as this belt 56 and its supporting platform 58 are positioned at a slight angle to the level of the machine with the candy stick receiving end of the belt lower than the forward end, a die 42 after swinging around the sprocket 38 at the feed-in corner of the machine, will ride in over the candy stick 72, and as the stick of candy while progressing through the machine at this point is gradually raised by the upward slope of the belt 56, the blade 48 will begin to cut downwardly into the candy stick as the die moves along concurrently with the belt 56. This cutting action is then completed by the pressure of the roller 60 at just about the time that the rear end of the die with the blade 48 leaves the forward end of the cutting table 58 and the belt 56. The dies 42, while mounted on the chain 32, are not completely supported by the chain but ride on and are mainly supported by a table top framework comprising plates 94, 96 and 98 arranged along three sides of the machine frame and upon which the candy stick is also supported and rides while in the dies. This support obviously does not extend across the rear of the machine where the ejection of the completed canes take place.

The angular position of the blade 48 results in a corresponding angular cut on the stick of candy 72, and as the die 42 swings around the corner at which the sprocket 38 is positioned (Figure 1), the forward portion of the cut-off stick of candy is shifted slightly outwardly as shown. As the die continues to travel around the sprocket 30, this bent and angularly cut portion of the stick contacts a rounded shaping cam 88 which is adjustably mounted on the framework 10. This imparts an initial bend to the still plastic stick of candy, and as the die with the preliminarily bent stick therein continues in its path of travel, the preliminarily bent over portion of the stick contacts a second cam or shaping element 90 also adjustably mounted on the framework 10 and extending clear across the front end thereof. This is preferably positioned at a slight angle to the framework and the path of travel of the dies so that the bent-over portion of the stick 72 will be gradually impelled into a practically parallel relationship with the cane portion of the stick, this action being completed by a third shaping cam 92 which is adjustably positioned along the third edge of the framework 10, all as best shown in Figure 1.

After the dies have rounded the sprocket 36, the canes have acquired their final desired shape and are ejected from the dies by means of the action of the cams 80 and dropped upon the discharge conveyor belt 74. Two or more ejector cams 80 are preferably furnished so that in the event the first fails to function, the second will positively force the completed cane out of the die whereby the same will then be free to travel around the sprocket 38 and over the incoming newly spun candy stick 72, after which it is gradually forced downwardly through the cutting position and the hereinabove described operations are repeated.

It will be apparent that herein is provided a simple yet efficient and speedy candy cane shaping mechanism which is more sanitary than the old hand shaping method besides producing a much more uniform product and in a more satisfactory and completely sanitary manner.

The entire apparatus is comparatively simple, which makes for greater operating effectiveness with a minimum loss of time and material due to breakage or repairs.

The operator of a machine of this type is assured of a uniform and satisfactory shape of cane, and can, therefore, figure his costs more closely and produce a more satisfactory product for the retailer and the purchasing public.

I am aware that many changes may be made and numerous details of construction varied throughout a wide range without departing from the principles of this invention, and I, therefore, do not purpose limiting the patent granted hereon otherwise than as necessitated by the prior art.

I claim as my invention:

1. A machine for cutting and shaping plastic material, comprising a framework, means for moving a plurality of cutting and shaping dies around the framework, each die including holding means, cutting means, shaping means and an ejector mechanism, means for introducing the plastic material in rod form into the dies in succession as they travel around the framework, and means cooperating with said cutting, shaping and ejecting means to produce and discharge from the machine a completed article.

2. A machine for cutting and shaping plastic material, comprising a framework, means for moving a plurality of cutting and shaping dies around the framework, each die including holding means, cutting means, shaping means and an ejector mechanism, and means cooperating with said cutting, shaping and ejecting means to produce and discharge from the machine a completed article, the means cooperating with the cutting means comprising a belt traveling beneath the dies for a portion of their travel.

3. A machine for cutting and shaping plastic material, comprising a framework, means for moving a plurality of cutting and shaping dies around the framework, each die including holding means, cutting means, shaping means and an ejector mechanism, and means cooperating with said cutting, shaping and ejecting means to produce and discharge from the machine a completed article, the means cooperating with the cutting means comprising a belt traveling beneath the dies for a portion of their travel and at the same rate of speed.

4. A machine for cutting and shaping plastic material, comprising a framework, means for moving a plurality of cutting and shaping dies around the framework, each die including holding means, cutting means, shaping means and an ejector mechanism, and means cooperating with said cutting, shaping and ejecting means to produce and discharge from the machine a completed article, the means cooperating with the cutting means comprising a belt traveling beneath the dies for a portion of their travel and at the same rate of speed, and a cutting table associated with the belt.

5. A machine for cutting and shaping plastic material, comprising a framework, means for moving a plurality of cutting and shaping dies around the framework, each die including holding means, cutting means, shaping means and an ejector mechanism, and means cooperating with said cutting, shaping and ejecting means to produce and discharge from the machine a completed article, the means cooperating with the cutting means comprising a belt traveling beneath the dies for a portion of their travel and at the same rate of speed, and means for moving the dies in and over the plastic article at the beginning of a cutting and shaping operation.

6. A machine for cutting and shaping plastic material, comprising a framework, means for moving a plurality of cutting and shaping dies around the framework, each die including holding means, cutting means, shaping means and an ejector mechanism, and means cooperating with said cutting, shaping and ejecting means to produce and discharge from the machine a completed article, the means cooperating with the cutting means comprising a belt traveling beneath the dies for a portion of their travel and at the same rate of speed, and means for moving the dies in and over the plastic article at the beginning of a cutting and shaping operation, together with further means for impelling the dies and blades downwardly to complete the cutting operation.

7. A machine for cutting and shaping plastic material, comprising a framework, means for moving a plurality of cutting and shaping dies around the framework, each die including material holding means, cutting means and an ejector mechanism, and a curved cam cooperating with said dies to produce a completed cut and shaped article.

8. A machine for cutting and shaping candy canes, comprising a framework, means for moving a plurality of cutting and shaping dies around the framework, each die including holding means, cutting means and an ejector mechanism, and means cooperating with said dies to shape and then discharge from the machine a completed article, the shaping means comprising a curved cam fixed on the framework.

9. A machine for making candy canes comprising a framework, means for feeding a length of candy cane material onto the framework, means for moving a plurality of cutting and shaping dies around the framework, each die including holding means, cutting means and an ejector mechanism, and means cooperating with said dies to produce a curved completed cane, said means comprising a curved cam adjustably mounted on the framework at one corner thereof.

10. A machine for cutting and shaping plastic material, comprising a framework, means for moving a plurality of cutting and shaping dies around the framework, each die including holding means, cutting means, shaping means and an ejector mechanism, and means cooperating with said cutting, shaping and ejecting means to produce and discharge from the machine a completed article, the means cooperating with the shaping means comprising a curved cam adjustably mounted on the framework, and further shaping cams also mounted on the framework.

11. A machine for cutting and shaping plastic material, comprising a framework, means for moving a plurality of cutting and shaping dies around the framework, each die including holding means, cutting means, shaping means and an ejector mechanism, and means cooperating with said cutting, shaping and ejecting means to produce and discharge from the machine a completed article, the means cooperating with the shaping means comprising a curved cam adjustably mounted on the framework, and further shaping cams also mounted on the framework adjacent the path of travel of the die.

12. A machine for cutting and shaping plastic material, comprising a framework, means for moving a plurality of cutting and shaping dies around the framework, each die including holding means, cutting means, shaping means and an ejector mechanism, and means cooperating with said cutting, shaping and ejecting means to produce and discharge from the machine a completed article, the means cooperating with the ejecting mechanism comprising an ejector cam mounted on the framework and above the last portion of the path of travel of the dies.

13. A machine for cutting and shaping plastic material, comprising a framework, means for moving a plurality of cutting and shaping dies around the framework, each die including holding means, cutting means, shaping means and an ejector mechanism, and means cooperating with said cutting, shaping and ejecting means to produce and discharge from the machine a completed article, the means cooperating with the shaping means comprising a curved cam adjustably mounted on the framework, and further shaping cams also mounted on the framework adjacent the path of travel of the die, the ejecting mechanism including a plate movably positioned in the die, a pin extending upwardly from the plate so as to be contacted by the ejector cam and a spring normally holding the pin and plate in raised position.

14. In a machine for making candy canes, a pair of grooved feed rollers, a rectangular framework, a chain moving around the edges of the framework, a plurality of cutting and shaping dies mounted on the chain, sprockets supporting the chain at the corners of the framework and stick candy bending means at one corner of the framework.

15. In a machine for making candy canes, a pair of grooved feed rollers, a rectangular framework, a chain moving around the edges of the framework, a plurality of cutting and shaping dies mounted on the chain, sprockets supporting the chain at the corners of the framework and stick candy bending means at one corner of the framework, the framework adjacent the feed rollers being positioned at a height so as to move the fed candy stick in and under the dies at that point.

16. In a machine for making candy canes, a pair of grooved feed rollers, a rectangular framework, a chain moving around the edges of the framework, a plurality of cutting and shaping dies mounted on the chain, sprockets supporting the chain at the corners of the framework and stick candy bending means at one corner of the framework, the framework adjacent the feed rollers being positioned at a height so as to move the fed candy stick in and under the dies at that point, and further means for forcing the dies downwardly upon the candy stick so as to sever the same by means of the cutting element in the die.

17. In a machine for making candy canes, a pair of grooved feed rollers, a rectangular framework, a chain moving around the edges of the framework, a plurality of cutting and shaping dies mounted on the chain, sprockets supporting the chain at the corners of the framework and stick candy bending means at one corner of the framework, the framework adjacent the feed rollers being positioned at a height so as to move the fed candy stick in and under the dies at that point, and further means for forcing the dies downwardly upon the candy stick so as to sever the same by means of the cutting element in the die, said means comprising a spring-pressed roller.

18. In a machine for making candy canes, a pair of grooved feed rollers, a rectangular framework, a chain moving around the edges of the framework, a plurality of cutting and shaping dies mounted on the chain, sprockets supporting the chain at the corners of the framework and stick candy bending means at one corner of the framework, the framework adjacent the feed rollers being positioned at a height so as to move the fed candy stick in and under the dies at that point, and further means for forcing the dies downwardly upon the candy stick so as to sever the same by means of the cutting element in the die, said means comprising a spring-pressed roller, the die having a cammed upper edge for cooperation with the roller.

19. In a machine for making candy canes, a pair of grooved feed rollers, a rectangular framework, a chain moving around the edges of the framework, a plurality of cutting and shaping dies mounted on the chain, sprockets supporting the chain at the corners of the framework and stick candy bending means at one corner of the framework, the framework adjacent the feed rollers being positioned at a height so as to move the fed candy stick in and under the dies at that point, and further means for forcing the dies downwardly upon the candy stick so as to sever the same by means of the cutting element in the die, the cutting means in the die comprising a blade positioned at approximately a 45° angle to the path of travel of the die.

20. In a machine for making candy canes, a pair of grooved feed rollers, a rectangular framework, a chain moving around the edges of the framework, a plurality of cutting and shaping dies mounted on the chain, sprockets supporting the chain at the corners of the framework and bar bending means at one corner of the framework, the framework adjacent the feed rollers being positioned at a height so as to move the fed candy stick in and under the dies at that point, and further means for forcing the dies downwardly upon the candy stick so as to sever the same by means of the cutting element in the die, the cutting means in the die comprising a blade positioned at approximately a 45° angle to the path of travel of the die, and means for swinging the severed end of the bar outwardly to instigate an initial portion of the bending operation thereon.

ROBERT I. STRONGIN.